(12) United States Patent  
Wu

(10) Patent No.: US 9,097,866 B2  
(45) Date of Patent: Aug. 4, 2015

(54) OPTICAL CONNECTOR WITH PRINTED CIRCUIT BOARD AND LENS ELEMENT BONDED TO EACH OTHER

(71) Applicant: HON HAI PRECISION INDUSTRY CO., LTD., New Taipei (TW)

(72) Inventor: Kai-Wen Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/962,970

(22) Filed: Aug. 9, 2013

(65) Prior Publication Data

US 2014/0199033 A1 Jul. 17, 2014

(30) Foreign Application Priority Data

Jan. 14, 2013 (TW) .............................. 102101266 A

(51) Int. Cl.
G02B 6/42 (2006.01)

(52) U.S. Cl.
CPC .............. *G02B 6/428* (2013.01); *G02B 6/4214* (2013.01); *G02B 6/423* (2013.01); *G02B 6/4204* (2013.01)

(58) Field of Classification Search
None
See application file for complete search history.

(56) References Cited

U.S. PATENT DOCUMENTS

| | | | |
|---|---|---|---|
| 6,359,740 B1 * | 3/2002 | Tsuchiya | 359/819 |
| 7,364,372 B2 * | 4/2008 | Nagasaka et al. | 385/92 |
| 8,092,102 B2 * | 1/2012 | Shangguan et al. | 396/529 |
| 2003/0113071 A1 * | 6/2003 | Kim et al. | 385/76 |
| 2004/0234213 A1 * | 11/2004 | Narayan et al. | 385/94 |
| 2004/0264890 A1 * | 12/2004 | Morioka | 385/93 |
| 2008/0232737 A1 * | 9/2008 | Ishigami et al. | 385/14 |
| 2009/0154877 A1 * | 6/2009 | Morioka | 385/39 |
| 2011/0317965 A1 * | 12/2011 | Fujimura et al. | 385/93 |
| 2012/0008899 A1 * | 1/2012 | Morioka | 385/33 |

* cited by examiner

*Primary Examiner* — Mike Stahl
(74) *Attorney, Agent, or Firm* — Novak Druce Connolly Bove + Quigg LLP

(57) ABSTRACT

An optical connector includes a printed circuit board, a photoelectric element, a lens element, and an adhesive. The photoelectric element is positioned on and electrically connected to the printed circuit board. The positioning element is an enclosing wall extending from the printed circuit board and enclosing the photoelectric element. The lens element includes a bottom surface, an internal lens formed on the bottom surface, and a supporting leg, which is an enclosing wall extending from a periphery of the bottom surface. The supporting leg is positioned on the printed circuit board and fittingly engaged with the positioning element. The adhesive is applied between the supporting leg and the printed circuit board.

5 Claims, 2 Drawing Sheets

OPTICAL CONNECTOR WITH PRINTED CIRCUIT BOARD AND LENS ELEMENT BONDED TO EACH OTHER

BACKGROUND

1. Technical Field

The present disclosure relates to optical connectors and, particularly, to an optical connector including a printed circuit board and a lens element bonded to the printed circuit board.

2. Description of Related Art

Optical connectors include a printed circuit board, a photoelectric element positioned on and electrically connected to the printed circuit board, and a lens element positioned on and fixed to the printed circuit board using adhesive. The lens element includes a lens and covers the photoelectric element such that the lens is aligned with the photoelectric element to increase light usage efficiency. However, the lens element needs to be engaged with other elements after being fixed to the printed circuit board, which may impact the lens element and knock it out of alignment.

Therefore, it is desirable to provide an optical connector that can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
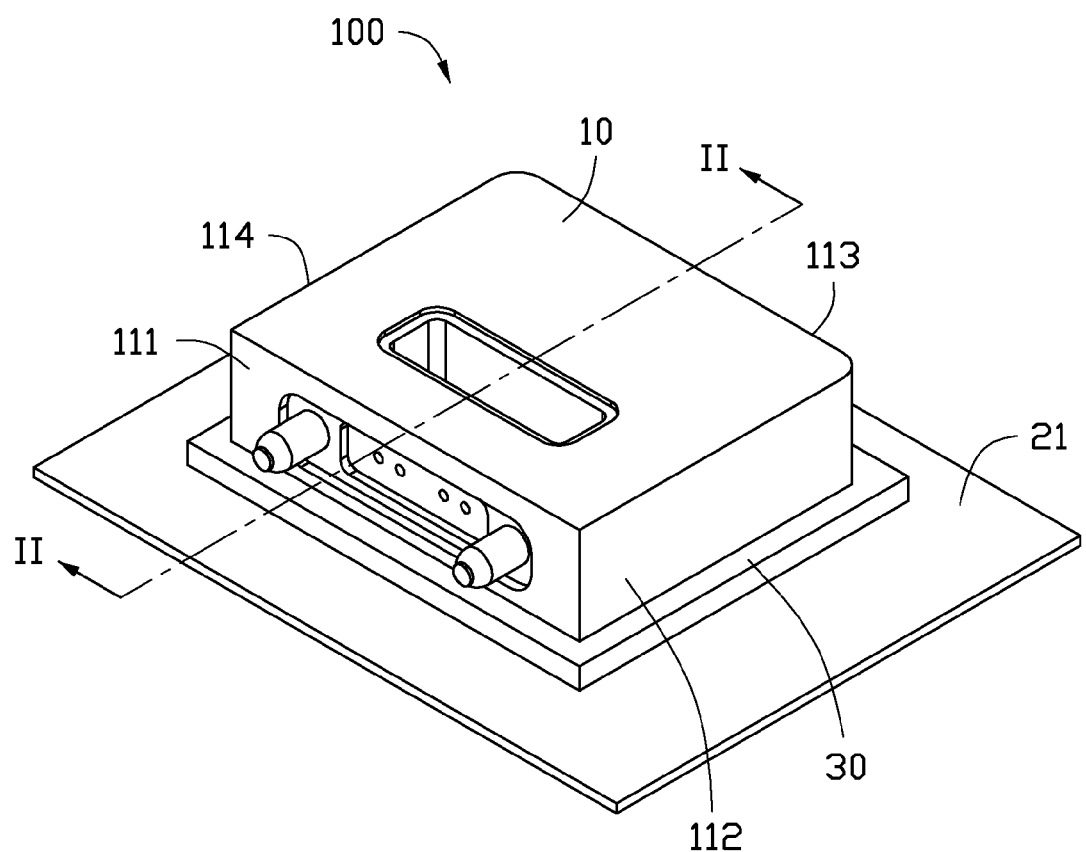
FIG. 1 is an isometric view of an optical connector, according to an embodiment.
Figure 2:
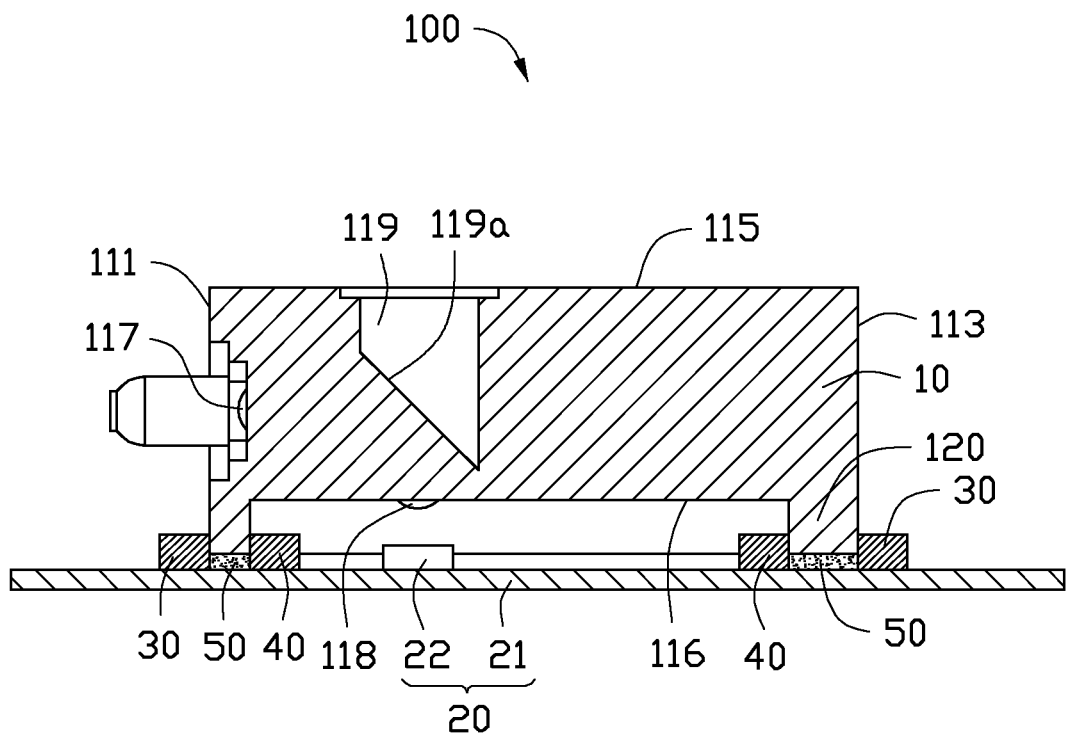
FIG. 2 is a cross-sectional view taken along a line II-II of FIG. 1.

FIGS. 1, 2 show an optical connector 100, according to an embodiment. The optical connector 100 includes a lens element 10, a photoelectric module 20, a first positioning element 30, a second positioning element 40, and an adhesive 50.

The lens element 10 is substantially rectangular and includes a front sidewall 111, a right sidewall 112, a back sidewall 113, a left sidewall 114, a top surface 115, and a bottom surface 116. The front sidewall 111 is substantially parallel with the back sidewall 113 and perpendicularly connected to the right sidewall 112 and the left sidewall 113. The back sidewall is also perpendicularly connected to the right sidewall 112 and the left sidewall 113. The top surface 115 and the bottom surface 116 are perpendicularly connected to the front sidewall 111, the right sidewall 112, the back sidewall 113, and the left sidewall 114.

The lens element 10 includes a number of external lenses 117 formed on the front surface 111, and a number of internal lenses 118 formed on the bottom surface 116. The external lenses 117 are arranged in a line that is substantially parallel with the top surface 115. The lens element 10 also defines a slot 119 in the top surface 115. The slot 119 extends along a direction that is substantially parallel with the front surface 111 and has a slanted reflective surface 119a. The internal lenses 118 are arranged in a line that is substantially parallel with the front surface 111 and are positioned such that each external lens 117 is optically coupled with one of the internal lenses 118 via the reflective surface 119a.

The lens element 10 also includes a supporting leg 120, which is a rectangular enclosing wall extending up from an outer periphery of the bottom surface 116.

The photoelectric module 20 includes a printed circuit board 21 and a number of photoelectric elements 22. The photoelectric elements 22 can be light emitters, such as light emitting diodes and laser diodes, or light receivers, such as photo diodes. The photoelectric elements 22 are positioned on and electrically connected to the printed circuit board 21. The photoelectric elements 22 are arranged in a line and correspond to the internal lenses 118 in position.

The first positioning element 30 and the second positioning element 40 are rectangular enclosing walls. The first positioning element 30 has an inner periphery substantially coinciding with but slightly larger than an outer periphery of the supporting leg 120. The second positioning element 40 has an outer periphery substantially coinciding with but slightly smaller than an inner periphery of the supporting leg 120. Thus, the first positioning element 30 can fittingly sleeve on the supporting leg 120 while, in turn, the supporting leg 120 can fittingly sleeve on the second positioning element 40.

In assembly, the first positioning element 30 and the second positioning element 40 are fixedly positioned on the printed circuit board 21, and the first positioning element 30 surrounds the second positioning element 40 while the second positioning element 40 surrounds the photoelectric elements 22. The adhesive 50 is applied to the printed circuit board 21, between the first positioning element 30 and the second positioning element 40. The first positioning element 30 and the second positioning element 40 are positioned in a way such that the supporting leg 120 can insert between the first positioning element 30 and the second positioning element 40 and each internal lens 118 is aligned with one of the photoelectric elements 22. Then, the supporting leg 120 is fixed to the printed circuit board 21 using the adhesive 50.

As such, the lens element 10 is limited by the first positioning element 30 and the second positioning element 40 and can withstand impacts when the lens element 10 is engaged with other elements of the optical connector 100.

Numbers of the external lenses 117, the internal lenses 118, and the photoelectric element 22 are not limited to this embodiment but can be changed in other embodiments depending on needs. For example, in other embodiments, the optical connector 100 can include only one external lens 117, one internal lens 118, and one photoelectric element 22.

In other embodiments, only one of the first positioning element 30 and the second positioning element 40 can be employed, as one of them also can limit the position of the lens element 10.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. An optical connector, comprising:
   a printed circuit board;
   a photoelectric element positioned on and electrically connected to the printed circuit board;
   a positioning element, which is an enclosing wall extending from the printed circuit board and enclosing the photoelectric element;
   a lens element comprising a bottom surface, an internal lens formed on the bottom surface, and a supporting leg, the supporting leg being an enclosing wall extending from a periphery of the bottom surface, the supporting leg being positioned on the printed circuit board and fittingly engaged with the positioning element, the supporting leg fittingly surrounding the positioning element; and an adhesive applied between the supporting leg and the printed circuit board.

2. The optical connector of claim 1, wherein the photoelectric element is a light emitter selected from the group consisting of a light emitting diode and a laser diode.

3. The optical connector of claim 1, wherein the photoelectric element is a light receiver.

4. The optical connector of claim 1, wherein the photoelectric element is a photo diode.

5. The optical connector of claim 1, wherein the lens element comprises a top surface opposite to the bottom surface, and a front sidewall perpendicularly connected to the bottom surface and the top surface, the lens element comprises an external lens formed on the front surface and corresponding to the second lens in position, the lens element defines a slot in the top surface, the slot has a slant reflective surface, and the first lens is optically coupled with the second lens by the reflective surface.

\* \* \* \* \*